April 5, 1966 S. T. KNOTT ETAL 3,245,032
MULTIPLE ELECTRODE SPARK SOURCE
Filed May 19, 1961 2 Sheets-Sheet 1

INVENTORS
SYDNEY T. KNOTT
WARREN E. WITZELL
BY
ATTORNEYS

April 5, 1966     S. T. KNOTT ETAL     3,245,032
MULTIPLE ELECTRODE SPARK SOURCE
Filed May 19, 1961     2 Sheets-Sheet 2
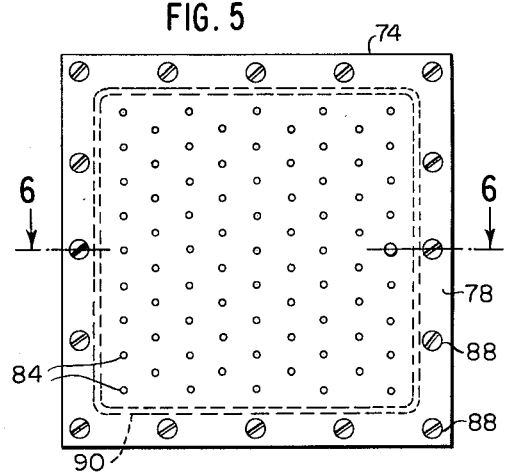
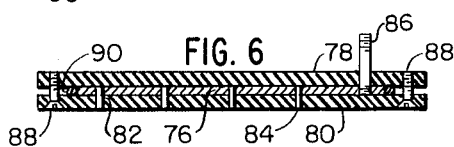
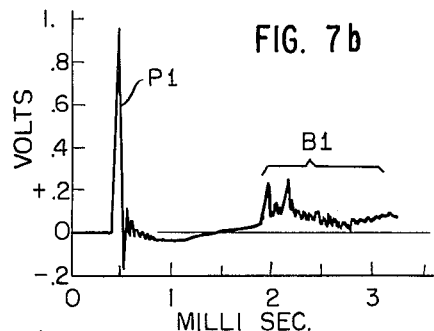
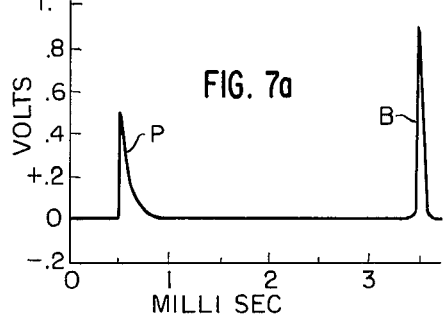
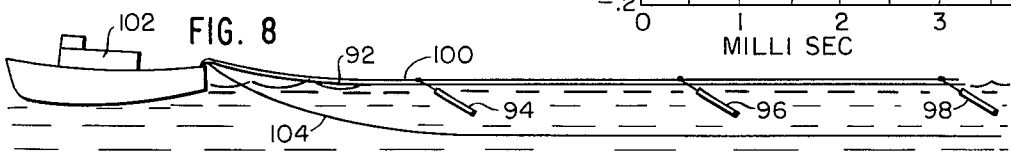
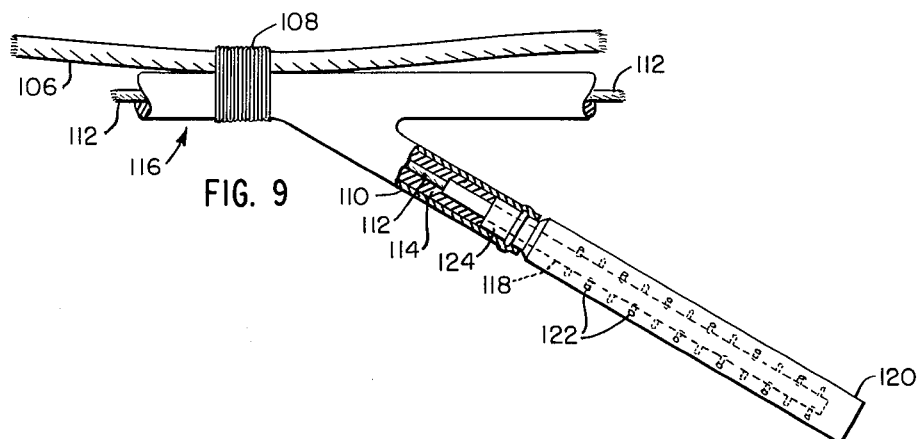
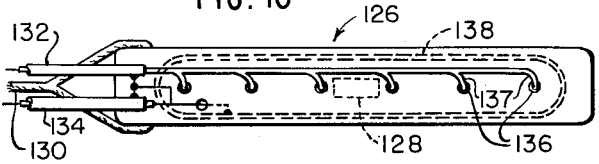
INVENTORS
SYDNEY T. KNOTT
WARREN E. WITZELL
ATTORNEYS United States Patent Office 3,245,032
Patented Apr. 5, 1966

3,245,032
MULTIPLE ELECTRODE SPARK SOURCE
Sydney T. Knott, Barnstable, and Warren E. Witzell, Woods Hole, Mass., assignors to Woods Hole Oceanographic Institution, Woods Hole, Mass., a corporation of Massachusetts
Filed May 19, 1961, Ser. No. 111,372
9 Claims. (Cl. 340—12)

The present invention relates generally to sources for the conversion of electrical energy into acoustic waves, and is more particularly concerned with sources capable of producing and accurately reproducing in rapid succession acoustic pulses comprised of a broad band of frequencies.

Sources of acoustic energy have many useful forms depending mainly upon the amount of energy to be produced and upon the desired frequency composition of the acoustic waves. This invention is concerned with the production of wave forms of a relatively high energy level comprised of a broad band of frequency components, referred to herein as "complex waves."

A primary object of the invention is to provide means for production of complex waves which are capable of a high rate of repetition with intervals, for example, of a fraction of a second, and which accurately reproduce the wave form with each repetition.

Known apparatus employing acoustic sources for complex waves has been found useful in oceanographic exploration, as shown for example in the co-pending application of Hersey and Knott, Serial No. 705,067, filed December 24, 1957, now Patent No. 3,065,815. As shown therein, a useful attribute of complex waves lies in the fact that the attenuation of the waves is a function of the density of the medium and this function varies with the frequency. For example, frequencies of less than 100 cycles per second are transmitted with little attenuation through rock or other dense substances. On the other hand, frequencies above 20 kilocycles per second may be transmitted through water with little attenuation but are very largely attenuated in denser media. Therefore, according to said application, a complex wave source generating a broad band of frequencies covering the range between these extremes is capable of penetrating media of varying densities which make up geological strata, and there is some reflection of the waves from each interface between the strata. The above-identified application describes a particular apparatus, including hydrophones and associated receiving equipment for reflected acoustic energy produced by such a source, such equipment being capable of analyzing the various reflections and reducing the data to a graphic profile representing an area to be explored.

The utility of accurate reproduction of the acoustic wave forms and of a high repetition rate is also exemplified by the above-identified application. In general, the method there described for surveying a water-covered area involves continuous movement of the acoustic wave source, whereby successive wave forms are produced as pulses at evenly-spaced intervals over a selected course in the surveyed area. It will be apparent that the pulses produced from the various positions are preferably substantially identical in wave form in order that the observed variations in the pattern of reflections from the interfaces between strata are nearly pure functions of the observed geological contours. It will also be apparent that higher horizontal resolution is achieved by repetition of the pulses at a fast rate, whereby the pulses emanate from points spaced only a short distance apart. The above-mentioned application also serves to illustrate the utility of an acoustic wave source that can meet the foregoing requirements at a high output power level, for a substantial amount of attenuation occurs in the pulses which penetrate to the deepest layers of interest.

In addition to uses of the type referred to in the above-mentioned application, there are other uses for complex wave acoustic sources, for example in echo ranging and in various sounding problems. In some applications, it is not necessary that the wave forms be accurately reproducible in rapid succession, but the need remains for apparatus capable of producing waves having substantial energy and high peak pressure.

Hitherto, the most common methods of producing complex wave forms for geological and oceanographic surveys have consisted of means for producing discrete pulses with no substantial energy being converted into acoustic waves in the time intervals between pulses. Such pulses have been produced by a variety of means, the most common being explosive charges and spark gaps.

The methods hitherto employed for the use of explosive charges have been found satisfactory only in certain applications because the explosions cannot be readily reproduced in rapid succession and the wave forms of successive explosions are not identical. Also, an explosion in water produces a bubble containing the products of the explosive reaction and a certain amount of water vapor, whereby an objectionable "bubble pulse" is produced. This is explained, in general, as follows. When the bubble expands to a volume such that its internal pressure equals that of the surrounding medium, it collapses and the in-rush of the medium produces the bubble pulse at a certain time interval following the original or primary pulse produced by the explosion. Hitherto, means have been proposed for reducing the amplitude of bubble pulses, since their presence tends to produce an ambiguity in the detected data, with the reflections from such pulses being erroneously interpreted as reflections from the primary pulses. Also, the amplitudes of bubble pulses are unpredictable and the time delays between the primary pulses and the bubble pulses are somewhat unpredictable.

The spark sources hitherto generally employed are provided with a single spark gap in which the acoustic wave is generated by the discharge of one or more condensers. These are so-called "single shot" sources. In most of such sources, the waves are produced by the fusion of a small wire extending between the electrodes in the spark gap. Such devices may be used in fresh water, since a suitable spark may be produced even though the surrounding medium is substantially non-electrolytic. Another type of single shot source has a so-called "defined gap," that is, no fuzible wire is provided but the electrodes are spaced an accurate distance apart and the intervening medium is ionized by the electrical discharge. Such devices are obviously affected by variable electrolytic properties in the surrounding medium, and the length of the gap is ordinarily a critical adjustment for proper operation. Certain defined gap sources require a special medium between the electrodes, for example distilled water. In such cases, it is desirable to enclose the gap within a vessel having pliable walls, the vessel walls being capable of transmitting the acoustic waves into the surrounding medium.

Spark sources also produce bubble pulses, in which the bubble generated by the spark is composed of water vapor and the products of hydrolysis. These bubble pulses are also sometimes objectionable because the time interval between the primary pulse and the bubble pulse and the amplitude of the latter may be variable and unpredictable as a result of the effect of ambient pressure changes at the gap on the size of the bubble and its location in the gap.

In addition to the foregoing limitations of the acoustic sources hitherto proposed, whether of the explosive or spark type, it should also be noted that in many cases more than a single bubble pulse is produced by the primary pulse. Where this occurs, the confusion of received data may often become so great as to substantially obscure the desired information. Accordingly, the present invention has for an important object the provision of a source of complex wave acoustic energy capable of producing pulses of relatively large energy, as compared with acoustic sources of the types hitherto widely used, and with bubble pulses of minimal amplitude.

A still further limitation of the single shot spark sources hitherto employed is that, as the amount of energy discharged through the gap is increased the disintegration of the electrodes increases, whereby the gap length tends to change as a result of each shot and the life of the source is severely limited. Accordingly it is another object of this invention to provide a spark source capable of producing acoustic waves of substantial energy with appreciably less wear upon the electrodes than that hitherto experienced with known "single shot" sources.

With the foregoing and other objects hereinafter described in view, the features of this invention include the provision of an improved multiple-shot acoustic spark wave source characterized by a common conductor, a means for connecting the common conductor to an external source of electrical energy such as a charged capacitor, and a suitable "ground" conductor also connected to the source and extending to the general vicinity of the common conductor, the common conductor having a plurality of mutually-spaced metallic pin-like electrodes electrically connected to and extending from its surface, this surface being covered by a body of insulating material. Preferably, the insulating material is so applied that it effectively covers the pin-like electrodes except for the end portions there of remote from the common conductor.

A feature of the foregoing construction, according to this invention, is that the electrical energy discharged from the source is distributed among the individual pin-like electrodes, and a spark is produced between each of these electrodes and the common "ground" conductor, whereby the energies in the waves produced by the individual electrodes are additive. In this manner, the total energy converted to acoustic form by the individual electrodes may be usefully increased substantially beyond the energy produced by discharging the same quantity of electrical energy through a single shot spark source of the type hitherto used.

A further feature of the foregoing construction is that, since the quantity of electrical energy discharged to each pin-like electrode is small relative to the total energy converted by all of the electrodes, the individual electrodes show substantially less wear in use, as compared with known single shot spark sources.

Other features of the invention reside in certain details of construction, arrangements of the various parts and modes of operation that will be more fully understood from the following description of certain alternative embodiments thereof, having reference to the appended drawings, in which:

FIG. 5 is a plan view illustrating in detail the construction of a "plate" array of the general form preferably employed the embodiment of FIGS. 1 to 4;

FIG. 6 is an elevation in section taken on line 6—6 in FIG. 5;

FIG. 7a is a spark wave characteristic of the general form produced by a "single shot" source of the type commonly in use;

FIG. 7b is a similar characteristic of a typical spark wave produced by each of the embodiments of the invention herein disclosed;

FIG. 8 is a view of an alternative multiple-electrode spark source "spread" towed on flexible lines and adapted for simultaneous energization, thus illustrating a second embodiment of the invention;

FIG. 9 is a side elevation of a third embodiment of the invention, designated a "stick" array;

FIG. 10 is a side elevation showing in detail a fourth embodiment of the invention.

Figure 1:
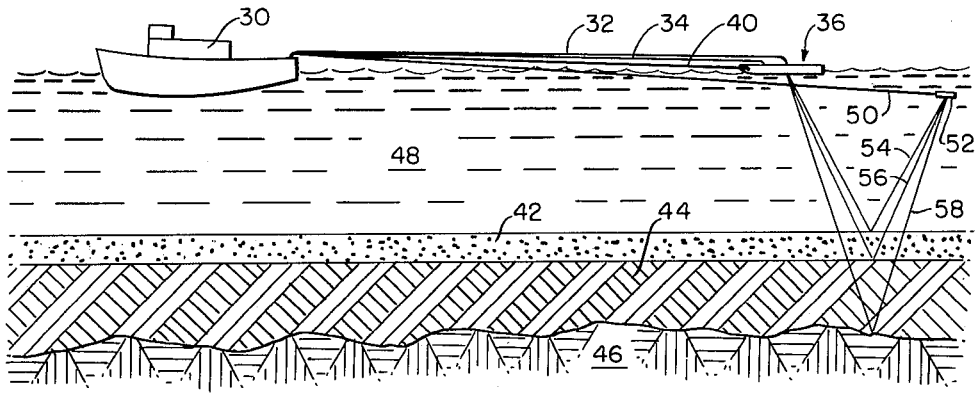
FIG. 1 is a view in profile of a surveying vessel with a towed spark source constructed according to this invention.

The drawings illustrate various alternative forms of the invention for oceanographic surveying, which are all characterized by the utilization of spark sources for the conversion of stored electrical energy into complex acoustic waves. The source of electrical energy may take any preferred form, and is preferably provided with one or more capacitors capable of holding a substantial quantity of electrical energy in the form of a stored charge, and of discharging this energy to the individual electrodes, in the form of a surge of electrical current through suitable connections herein described. The preferred electrical circuit connected to this source is illustrated schematically in FIG. 4, wherein a source of conventional construction and its associated capacitors are depicted at 12 and shielded transmission lines 14 and 16 are shown connected between the generator and a spark source designated generally at 18. The shielded line 14 is designated the "hot" line, and is connected to a common metallic conductor 20, the conductor being connected electrically to each of a plurality of mutually-spaced metallic pin-like electrodes 22 exposed in the wave propagating medium. The other transmission line 16 and the shields of both transmission lines are mutually connected to a "ground" conductor 24, the conductor 24 being connected to the opposite side of the generator 12 and having a portion of extended length exposed in intimate contact with the wave propagating medium.

The common conductor 20 is completely enclosed by a body of insulating material schematically represented at 26, this body surrounding the pin-like electrodes but leaving the extended ends thereof exposed to the wave propagating medium.

By suitable conventional means (not illustrated), the charged capacitor or capacitors within the generator 12 may be suddenly connected across the lines 14 and 16, thereby generating substantially simultaneous electrical arcs across individual discharge paths from each of the electrodes 22 to the water, the ground conductor 24 assuring the establishment of a concentrated and relatively uniform electrical field.

According to a simplified variant of the foregoing electrical circuit, the shield 28 about the line 14 may be utilized as the ground return for the circuit, in which case the line 16 can be eliminated. However, for reasons of safety the illustrated arrangement is preferred because it reduces the probability of injury to a person coming in contact with a faulty cable.

As hereinafter shown in detail, the source 18 and the ground return conductor 24 may take various forms depending upon the characteristics of the wave transmission medium. If the medium is electrolytic in nature, for example sea water, the distance between each of the pin-like electrodes 22 and the common return conductor 24 may be of variable length without having a substantial effect upon the current in the individual sparks. In other words, since the impedance of each spark path remains substantially equal to that of each of the other paths regardless of the distance from the ground conductor 24, each spark will carry substantially the same current and will convert to acoustic energy approximately the same quantity of electrical energy. On the other hand, in non-electrolytic media such as fresh water, the spacing between each of the pin-like electrodes 22 and the ground return 24 has a more critical effect upon the relative distribution of current among the electrodes. In that case, the conductor 24 may take an extended form, wherein various portions thereof are approximately equally spaced from each of the electrodes 22. One suitable form of the conductor 24 may be a wire screen or grid, for example. The ground return element 24 may also take the form of a metallic plate, a wire or a braid of wire situated in the general vicinity of the pin-like electrodes, in intimate contact with the wave-propagating medium and electrically connected at one end to one side of generator 12.

FIGS. 7a and 7b illustrate the improvement in the wave characteristics resulting from the use of simultaneously-fired multiple sparks according to this invention. FIG. 7a illustrates a typical spark wave characteristic for a single shot source of the type commonly found in the prior art. A primary pulse P is generated by the spark discharge across the gap between two electrodes. These electrodes are analogous to the combination of a single one of the electrodes 22 of FIG. 4 with the associated ground return conductor 24. It will be understood that suitable acoustic receivers or hydrophones are disposed within the propagating medium in order to pick up the reflected pulses.

The wave P rises very sharply and decays in a generally exponential manner, while at the same time a bubble containing water vapor and products of electrolysis (hydrogen, oxygen and, in salt water, chlorine) expands within the gap. The expansion of the bubble is due to the fact that its pressure is greater than that of the surrounding medium. Eventually, the bubble expands until the pressure within it equals that of the surrounding medium, whereupon the bubble begins to collapse. The in-rush of the surrounding medium then gives rise to a bubble wave B which, as in the illustrated case, may actually be of greater amplitude and sharpness than the wave P. The wave B is propagated through the medium in the same manner and at the same velocity as the wave P, and produces similar reflections and refractions at the surfaces and interfaces of the various bodies upon which it impinges.

In accordance with conventional practice, the timing of the primary wave P is ordinarily precisely determined, whereby a useful interpretation may be made of the reflected pulses, based on the time duration between the generation of the wave P and the time when the reflected wave reaches the receiving transducer. However, the same is not always true for the wave B, due to the fact that the time lag between the wave B and the wave P cannot always be determined with accuracy, this time lag being a function of the size of the bubble formed and also of the pressure in the wave propagating medium adjacent the spark source. As a result, tedious methods must be employed in order to differentiate the reflections received from the undesired bubble pulse.

Figure 4:
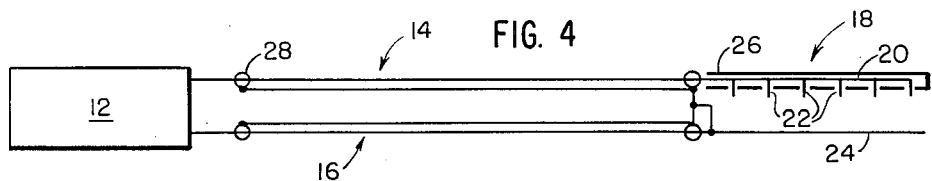
FIG. 4 is a schematic circuit diagram of the preferred electrical connections between the source of electrical energy and the tow shown in FIGS. 1 to 3.

FIG. 7b illustrates a typical wave form resulting from the improved spark source illustrated in schematic form in FIG. 4. The characteristic in this figure represents typical pulses produced by all of the embodiments herein disclosed. There is shown a primary wave P1 which may be described as the total or net pressure wave resulting from the addition of the individual primary waves produced by the pin-like electrodes 22. This figure illustrates the approximate amplitude of the net primary wave produced by a multiple-electrode source according to the invention when connected to a generator capable of discharging substantially the same quantity of electrical energy as the generator producing the wave illustrated in FIG. 7a through a single spark gap. In other words, using a generator of the same energy output, the primary wave is substantially greater in amplitude than the wave produced by a single-shot source.

In addition, FIG. 7b shows a portion B1 of the wave form, which may be described as the sum of the individual bubble pulses generated at the simultaneously discharged electrodes such as 22. It will be observed that these bubble pulses are not almost algebraically additive as in the case of the primary pulses, but occur at slightly different times due to slight inequalities in the bubble sizes, and the result is to produce a certain degree of mutual interference between the bubble pulses. Thus, while the period of transmission of the bubble pulses may occur over a substantially greater interval than that of the bubble pulse B in FIG. 7a, the total amplitude does not reach a comparable level. Hence, the observed reflections from the bubble pulses are of greatly attenuated amplitude and improved results are readily observed in the data from the receiving hydrophones.

It will be understood that the source 18 of FIG. 4 may be supported in any of a variety of ways, and may be exposed to a variety of acoustic wave propagating media. For example, such a source may be suspended in water, either fresh or containing salt. It may be mounted directly upon the hull of a vessel or other structure submerged in the water, or it may be towed behind the vessel. FIG. 1 illustrates a preferred method used for oceanographic exploration. A vessel 30 is provided with a generator of the form illustrated at 12 in FIG. 4, and a pair of cables 32 and 34 corresponding, respectively, to the lines 14 and 16 in FIG. 4. The cables 32 and 34 extend to a tow or "fish" 36, which may take the form of a wooden plank 37 or the like. The plank may be provided with weights 38 (FIGS. 2 and 3) adapted to hold it in fixed position in the water at or near the surface. A tow cable 40 is preferably provided to pull the tow through the water, while taking the tension off the cables 32 and 34. If desired, the cables 32 and 34 may be provided with bouyant sleeves to hold them near the surface of the water, such sleeves being of any known form, such as tubular foam material.

In FIG. 1 are also shown a number of formations 42, 44 and 46 in water 48 illustrating a typical sub-bottom profile. The stratum 42 consists of watery mud of approximately the same density as the water. The stratum 44 consists of alluvial material of a greater density. The stratum 46, consists of a dense material such as igneous rock.

A cable 50 is provided to tow a hydrophone 52 of a conventional type in spaced relation to the tow 36. Because of the complex wave characteristics of the source mounted on the tow 36, the lowest frequency components of the emitted pulses are capable of penetration of all of the illustrated strata, and certain higher frequency components, while being capable of penetrating the less dense strata, are rapidly attenuated in the more dense strata. Pulses are reflected from the interfaces between all of the strata. Thus reflections of the highest frequency components received at the hydrophone 52 may follow only a path 54, while reflections of somewhat lower frequency components may also follow a path 56, and reflections composed of still lower frequency components may also follow a path 58. It will be understood that the hydrophone 52 receives these reflections and transmits the information by a wire circuit to a suitable receiver in the vessel 30, wherein means are provided for interpretation of the received data as functions of the depths of the interfaces between strata at which reflections occur.

Figure 2:
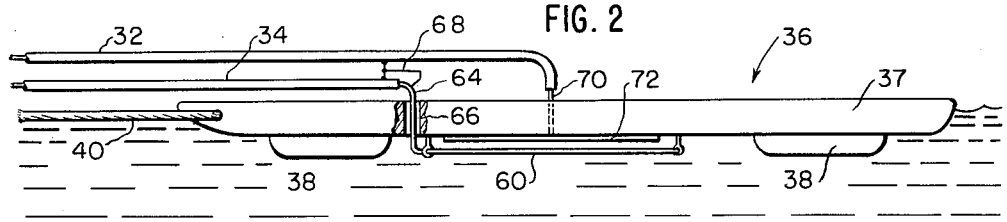
FIG. 2 is a side elevation in detail of the tow shown in FIG. 1.
Figure 3:
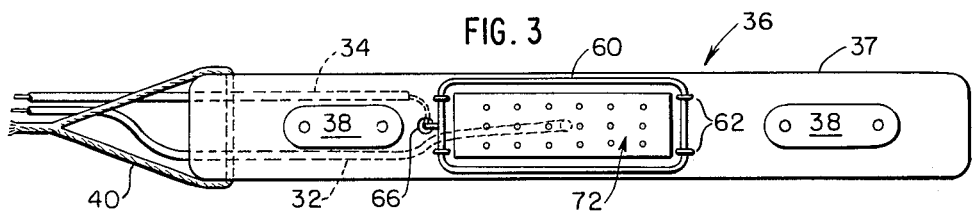
FIG. 3 is a bottom view of the tow shown in FIGS. 1 and 2.

Details of the construction of the tow 36 are shown in FIGS. 2 and 3. FIG. 3 is a bottom view of the tow, and shows a closed metallic wire loop 60 secured to the plank 37 by staple fasteners 62 driven into the plank. The loop 60 is connected electrically to a wire 64 extending through a drilled hole 66 in the plank and connected to the ground cable 34. A wire 68 connects the electrically conducting shields of the cables 32 and 34 to the wire 64. It will be understood that the shields of the cables are otherwise respectively insulated from the wires passing therethrough. A wire 70 within the cable 32 is connected to a rectangular electrode "plate" 72. FIG. 5 shows a similar electrode plate 74 of generally square shape. The construction of the plates 72 and 74 is identical except for shape. The plate 74 is provided with a sheet 76 of metal having perforations forming a regular pattern. The sheet 76 is enclosed by electrical insulating material taking the form of a pair of sheets 78 and 80 of phenolic resin or other suitable material. It will be apparent that the insulation shown is merely illustrative, and other forms of insulation including dipped and sprayed coatings may be applied in the alternative. The sheet 80 has holes 82 matching the holes in the sheet 76. The latter holes receive a plurality of metallic pins 84, preferably with a force fit, whereby a secure electrical connection is made between each of the pins 84 and the sheet 76. The ends of the pins 84 are preferably substantially flush with the surface of the sheet 80.

A terminal post 86 is threaded in the sheet 76, extends through the sheet 78, and is provided with threads suitable for connection to a suitable matching part secured to the wire 70 (FIG. 2). The assembly is held together securely by a set of screws 88 spaced about the periphery of the assembly. Preferably, a band of resilient insulation 90 similar to an O-ring is arranged about the periphery of the metallic sheet 76 and compressed between the sheets 78 and 80, thereby insulating the sheet 76 from the water.

While the multiple-electrode sources of FIGS. 1 to 6 are characterized by a rigid spacial relationship between the individual electrodes due to their being secured to a common rigid conductor, it is also possible to provide a multiple-source array in which the individual electrodes are supported and mutually connected by flexible cables, as shown in FIG. 8. FIG. 8 shows a tow cable 92 connected to a number of individual sources 94, 96 and 98 forming an array. A second interconnecting cable 100 is connected to a generator similar to the generator 12 of FIG. 4. A vessel 102 tows the array and also a ground cable 104. The sources 94, 96 and 98 may take various forms. For example, they may be individual single spark sources of the general type hitherto known in the art. Also, one or more of the sources 94, 96 and 98 may comprise multiple-electrode sources similar to the plate source illustrated in FIG. 5. When the vessel 102 is in motion, the spacing of the sources 94, 96 and 98 is known, and since these sources are all connected directly to the cable 100 and each source is substantially the same distance from the ground return cable 104, the spark pulses generated by these sources are substantially equal. It will be understood that the sources 94, 96 and 98 will be single-shot sources of the conventional form in cases where energy of limited magnitude is sufficient; whereas, for greater energy levels of pulses it is preferable to employ the improved multiple-electrode sources according to this invention. It will be understood that more than the three sources 94, 96 and 98 may be employed if desired.

FIG. 9 illustrates a different form of this invention, characterized as a "stick" array. There is provided a tow cable 106 secured by a lashing 108 to a sheath 110 consisting of a woven metallic braid forming a shield for a stranded wire conductor 112. The wire 112 is surrounded by insulation 114. The parts 110, 112 and 114 comprise a shielded cable designated generally at 116 extending to the generator 12 (FIG. 4). The cable 116 may be, for example, the cable 100 of FIG. 8 or the cable 14 of FIG. 4.

A metallic rod 118 is received in a hole drilled axially part-way through a cylindrical body 120 of polyethylene, polyvinyl chloride or phenolic resin, or other suitable insulating material. A plurality of radial holes are drilled through the body 120 and into the rod 118, and a plurality of metallic pins 122 are press fitted into these holes so that they make firm electrical connection to the rod 118 with their ends approximately flush with the outer surface of the body 120. The body 120 has a portion 124 of reduced diameter which extends within the sheath 110 of the cable 116. Thus the rod 118 is insulated from electrical contact with the water except through the tips of the electrodes 122. It will be obvious that the rod 118 may take some shape other than the illustrated cylindrical form, and various other spacings and arrangements of the electrodes 122 may be employed. For example, the electrodes 122 are preferably displaced angularly as well as longitudinally of the rods 118.

FIG. 10 shows still another embodiment of the multiple-electrode complex wave source, consisting of a plank 126 similar to the plank 36 (FIG. 2), the plank 126 having a weight 128. A tow cable 130 is secured to the plank. A pair of coaxial cables 132 and 134 extend to the generator 12, and are connected to the latter in the manner illustrated in FIG. 4. The cable 132 is connected to each of a plurality of pins 136 by an insulated stub wire 137, each of the pins 136 passing through a drilled hole in the plank 126 and preferably protruding into the water a short distance below the plank. The pins 136 form a straight line on the lower side of the plank 126.

Surrounding the downwardly-protruding ends of the pins 136, is a loop 138 of copper tubing conforming in shape generally to the loop 60 of FIG. 3, this loop 138 being electrically connected to the shields of the cables 132 and 134, and also being connected to the "ground" conductor passing through the center of the cable 134 in the manner illustrated in FIG. 4.

In each of the embodiments heretofore described with reference to FIGS. 1 to 10 inclusive, the non-simultaneous occurrence of the bubble pulses produced by the individual pin-like electrodes results in a wave form like that shown in FIG. 7b. This wave form has a portion B1 showing that the bubble pulses do not add algebraically, and results from certain small differences between the electrodes, including their respective distances from the ground return circuit, the power levels of the individual primary pulses, and the shapes and sizes of the electrodes. It will be understood that the dimensional variations are small in relation to the magnitude of the dimensions and insufficient to affect the substantially simultaneous occurrence of the primary pulses.

From the foregoing description, it will be clear that a large variety of constructions for a multiple-electrode spark source may be devised. Therefore, it will be understood that various modifications and adaptations in design and in configuration of the source may be employed in accordance with the skills of those familiar with this art, having in mind the teachings of this invention, without departing from the spirit or the scope thereof.

Having thus described the invention, we claim:

1. A spark generation system for initiating acoustic pulses in a fluid medium having, in combination, a self-supporting common electrical conductor having a uniform surface defining a plurality of electrode positions mutually spaced in a plurality of dimensions, a body of insulation uniformly covering said surface throughout the area of said electrode positions, a plurality of electrodes each fastened to and electrically connected with said common conductor and having a portion projecting therefrom at one of said positions through said body of insulation to and substantially flush with the surface of said body, a return conductor spaced from said electrodes and common conductor, and a source of electrical energy including a charged capacitor and means to cause the capacitor to be suddenly connected between said common electrical conductor and said return conductor to send a sudden discharge of current substantially simultaneously through all of said electrodes to said return conductor.

2. The combination according to claim 1, in which the common electrical conductor is a metallic plate.

3. The combination according to claim 1, in which the common electrical conductor is a substantially flat metallic plate and the body of insulation is in the form of a sheet secured to the surface of said plate.

4. The combination according to claim 1, in which the common electrical conductor is a metallic rod and the body of insulation is in the form of a sleeve received over said rod.

5. The combination according to claim 1, in which the common electrical conductor is a metallic rod and the electrodes are pin-like elements mutually spaced both angularly about and longitudinally of the rod.

6. The combination according to claim 1, wherein the source of electrical energy has a pair of mutually insulated conductor lines respectively connected with the common electrical conductor and the return conductor, said conductor lines having individual electrically conductive shields connected with the return conductor.

7. A spark generation system for initiating acoustic pulses in water having, in combination, a tow, a tow line connected to the tow, a spark electrode device secured to the tow, a source of electrical energy and a pair of mutually insulated electrical conductor lines connected to said source, supported by said tow line and extending to said spark electrode device, said spark electrode device including a self-supporting metallic support member secured to the tow and having a uniform surface defining a plurality of electrode positions mutually spaced in a plurality of dimensions, a body of insulation uniformly covering said surface of the support member throughout the area of said electrode positions, a plurality of electrodes each fastened to and electrically connected with said support member and having a portion projecting therefrom at one of said positions through said body to and substantially flush with the surface thereof in mutually spaced relation to the corresponding portions of the other said electrodes, a return conductor fastened to the tow in spaced relation to the electrodes, and connections from the support member and return conductor to said pair of conductor lines, respectively, said source of electrical energy including a charged capacitor and means to cause the capacitor to be suddenly connected between said pair of conductor lines to send a sudden discharge of current substantially simultaneously through all of said electrodes to said return conductor.

8. The combination according to claim 7, in which each of the pair of electrical conductor lines has an individual electrically conductive shield connected with the return conductor.

9. The combination according to claim 7, in which the support member is a metallic plate and the electrodes are pin-like elements extending from the surface of the plate.

References Cited by the Examiner

UNITED STATES PATENTS

| 672,231 | 4/1901 | Lacomme | 340—12 |
| 1,152,697 | 9/1915 | Bodde | 340—12 |
| 1,758,993 | 5/1930 | Wolff | 340—12 |
| 3,007,133 | 10/1961 | Padberg | 340—12 |
| 3,022,852 | 2/1962 | Pavey | 340—12 X |

FOREIGN PATENTS 195,135  1/1958  Austria.

CHESTER L. JUSTUS, *Primary Examiner.*